Dec. 20, 1960

N. MILLER 2,964,966

AIR CONDITIONER CONTROL

Filed Oct. 26, 1956

Inventor
NICHOLAS MILLER

Attys

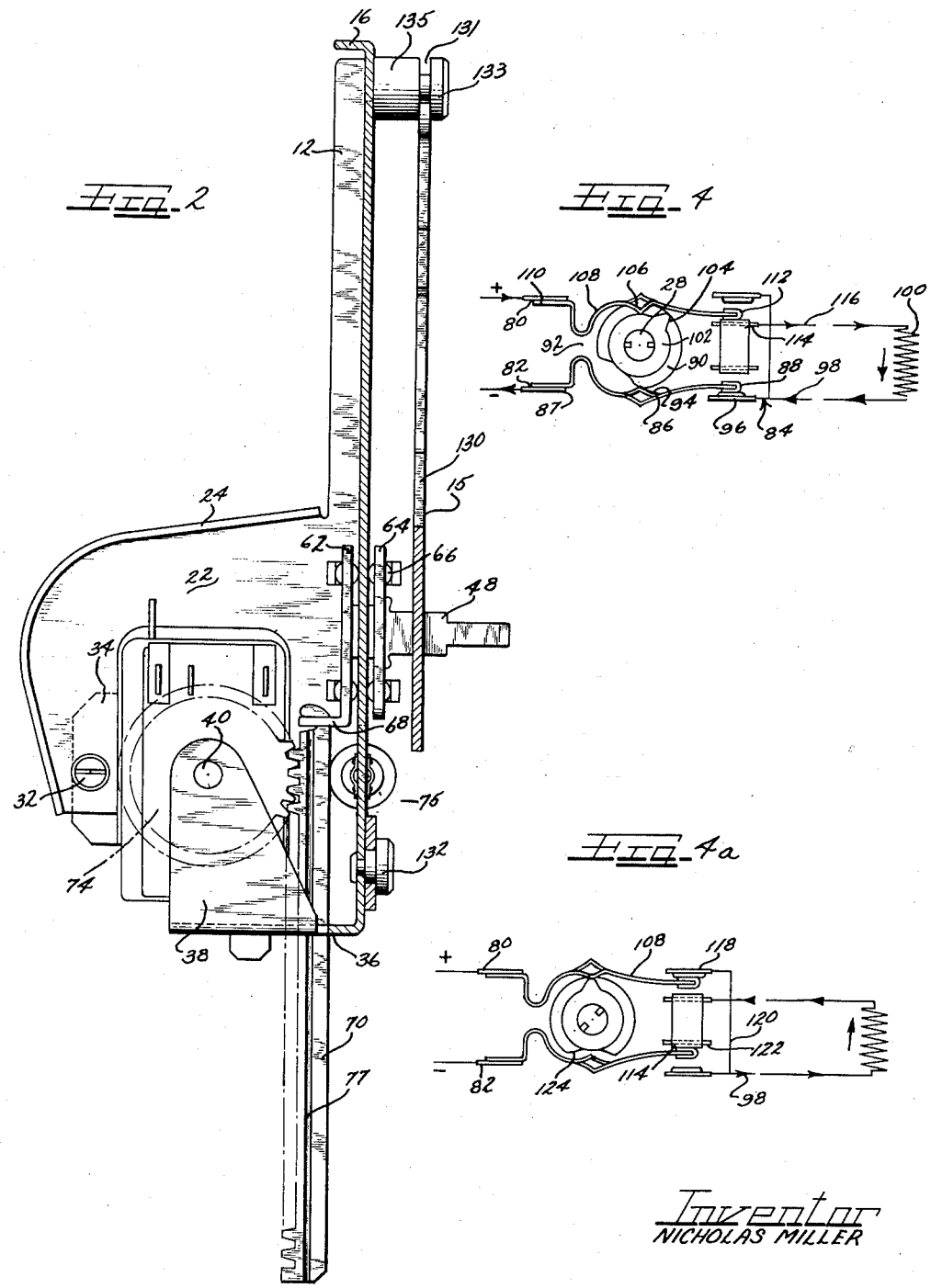

Dec. 20, 1960   N. MILLER   2,964,966
AIR CONDITIONER CONTROL
Filed Oct. 26, 1956   4 Sheets-Sheet 3
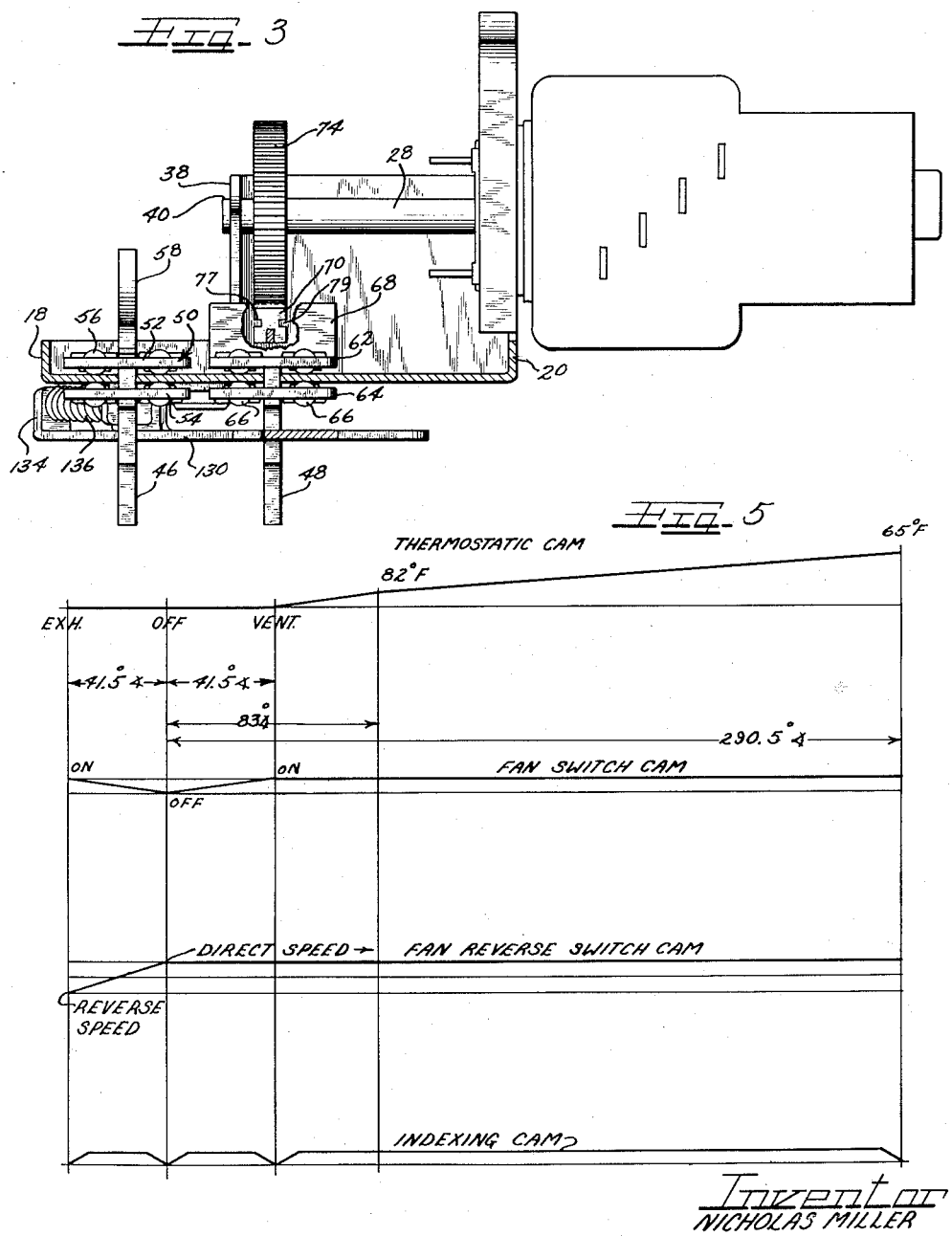

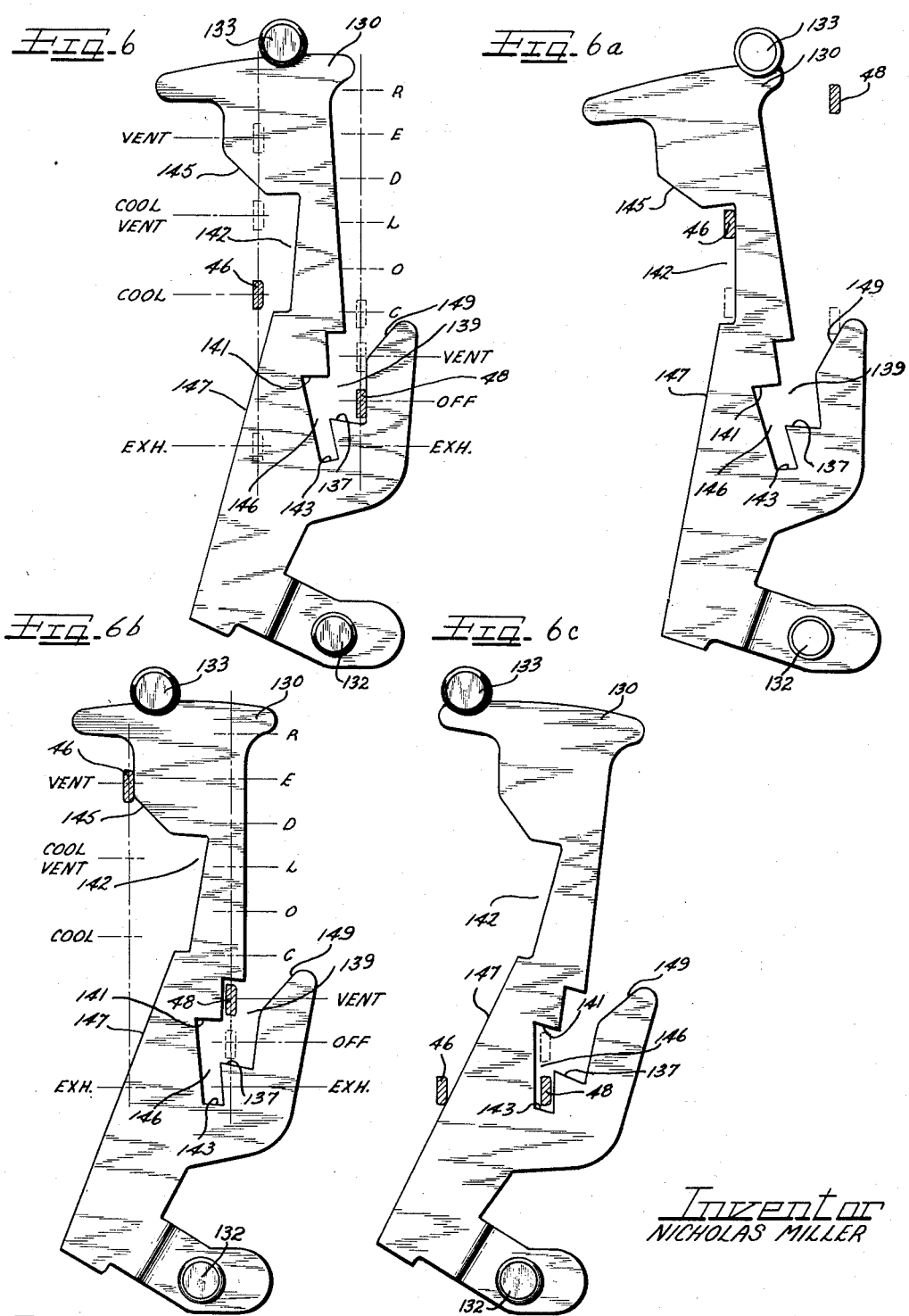

United States Patent Office 2,964,966
Patented Dec. 20, 1960

2,964,966

AIR CONDITIONER CONTROL

Nicholas Miller, Chicago, Ill., assignor to The Dole Valve Company, Chicago, Ill., a corporation of Illinois Filed Oct. 26, 1956, Ser. No. 618,580

4 Claims. (Cl. 74—483)

This invention relates to an actuator apparatus for a thermostatic control device and more particularly to apparatus for actuating the several controls for a room-type air conditioner or the like, though not so limited.

In particular, the invention relates to apparatus for integrating and coordinating the ventilation control and temperature control of a room-type air conditioner employing a thermostatic control device of the type set forth in applicant's copending application Serial No. 593,541, filed June 25, 1956, the disclosure of which is incorporated herein by reference, and of which this application forms a continuation in part. The control device set forth in that application comprises a unitary composite rotary switch having a rotatable shaft provided with a plurality of axially spaced switch units having cams for selective energization of the several electrical circuits of a room-type air conditioning unit. These units include an on-off switch for the compressor and a similar switch for the fan. The composite switch also includes a thermally responsive switch, automatically operable in response to ambient temperature conditions to operate the air conditioner within manually selectable ranges. In that application, the fan switch and the compressor switch as well as the thermally responsive switch are actuated by rotation of a calibrated knob fixed to the shaft.

A principal object of the invention is to provide an actuator apparatus for a switch of the type shown in applicant's copending application which may readily be coordinated with the movement of a sliding lever for operating a damper and baffle in a manner that inadvertent discharge of cooled air to the outside atmosphere is precluded.

A further object of the invention is to provide actuator apparatus of the type described in which the baffle and damper and the electrical controls may be operated at one convenient station and in which the accuracy of the rotary switch calibration is maintained.

Another object of the invention is to provide an actuator apparatus of the mentioned type which is characterized by convenience in form and improved functional characteristics.

A more particular object of the invention is to provide a device of the character described in which a first knob controls the opening and closing of the baffle and damper for exhaust without cooling, cooling without ventilation, cooling with ventilation, and ventilation without cooling, and in which a second knob controls the normal and reverse direction of rotation of the fan motor and the operation of the compressor motor so that the fan and compressor motors may be deenergized in certain positions of the first knob, and so that the fan and compressor motors may be energized in certain other positions of the first knob.

A further object of the invention is to provide an actuator apparatus of the type described in which the rotary motion required for operation of the switch is converted to linear motion of the second knot by means of a gear and rack assembly, and in which an interlock is provided to prevent movement of the first knob when the second knob is moved into certain positions.

A still further object of the invention is to provide an actuator apparatus having interlock means to prevent movement of the second knob when the first knob is in certain positions.

A more particular object of the invention is to provide a control apparatus for an air conditioner of the room type having a baffle and damper and a switch for controlling the operation of the fan and compressor wherein interlock means are provided to prevent energization of the compressor when the damper is set for ventilation without cooling, with the fan set to rotate in the normal direction and when the damper is set for exhausting room air, with the direction of rotation of the fan reversed, and to prevent opening of the damper to the position for ventilation without cooling and to the position for exhausting room air when the compressor is energized.

An additional object of the invention is to provide an actuator apparatus having interlock means for coordinating the operation of the baffle and damper with the operation of the switch so that the air conditioning unit may be operated to recirculate and cool the air in a room while discharging the heat outdoors, to introduce fresh cooled air into a room, to introduce fresh uncooled air into a room, or to exhaust the room air into the outside atmosphere.

These, and other objects of the invention will be apparent from time to time as the specification proceeds and with reference to the accompanying drawings wherein:

Figure 2 is an elevational view taken substantially on line II—II of Fig. 1;

Figure 3 is a plan view taken substantially on line III—III of Figure 1;

Figure 4 is a diagrammatic view of a switch unit forming a part of the composite switch of Figure 1, showing the position assumed when the fan motor is set for direct operation;

Figure 4a is a view similar to Fig. 4 but showing the switch unit in the position it assumes when the fan motor is set for reverse operation;

Figure 5 is a chart showing the relative positions of a thermostat cam forming a part of the thermally responsive element of the composite switch, the fan switch cam, the fan reverse switch cam, and an indexing cam also forming a part of the composite switch of Fig. 1;

Figure 1:
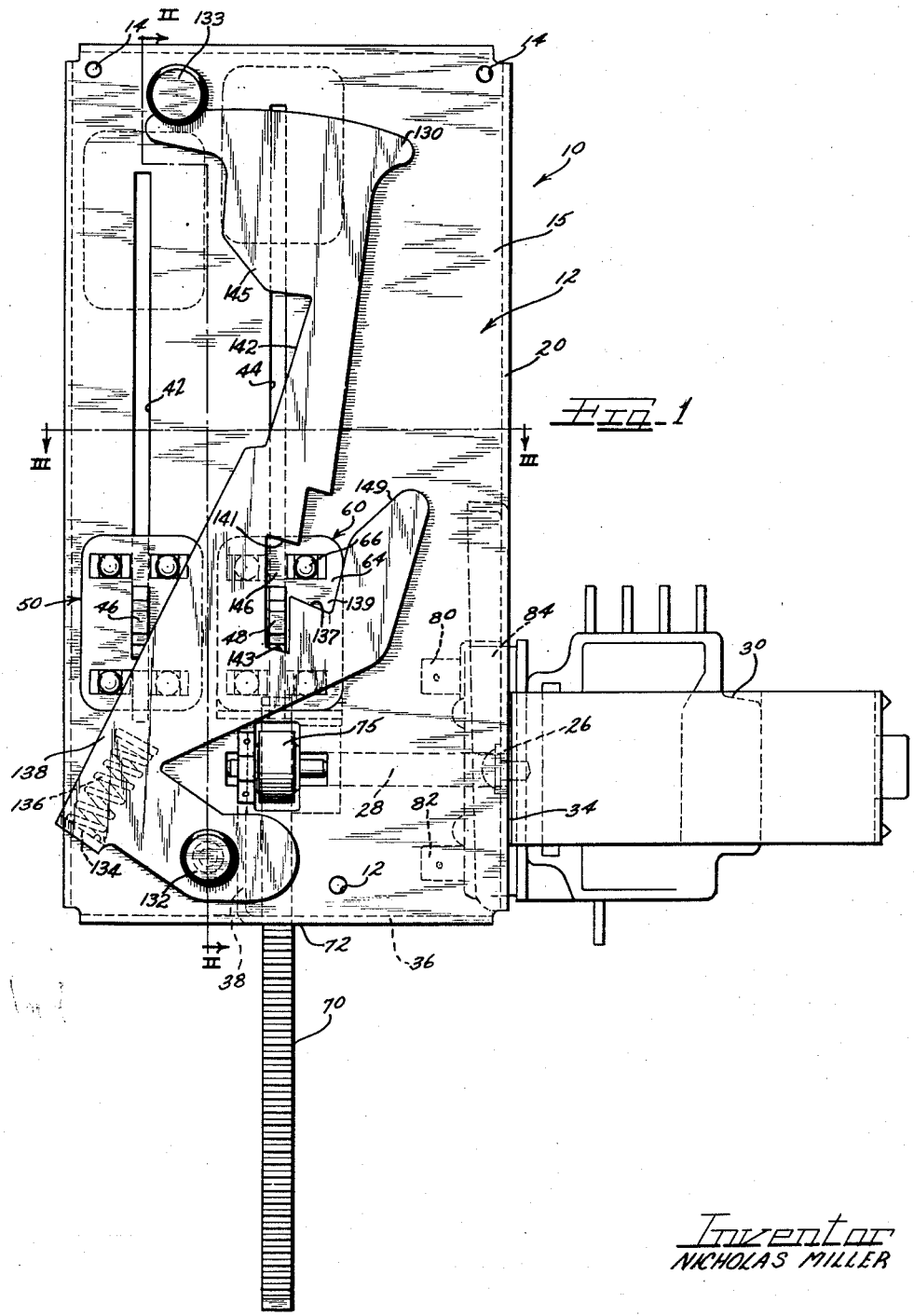
Figure 1 is an elevational front view of the actuator apparatus of the present invention shown in conjunction with a composite switch of the general type set forth in applicant's above mentioned copending application.

Figures 6, 6a, 6b and 6c are elevational views of the interlock of the present invention in the several positions of operation, Fig. 6a showing the position of the interlock in which movement of the lever controlling the operation of the baffle and damper is restricted and Figs. 6b and 6c showing two positions of the interlock in which movement of the lever for operating the composite switch is restricted.

As shown on the drawings:

With reference to the drawings and more particularly to Fig. 1, the actuator apparatus of the present invention, indicated generally by reference numeral 10, includes a supporting frame or mounting plate 12 which may be secured by suitable fastening elements (not shown) received in openings 14 formed in a main panel 15 and passing through the housing or casing (not shown) of a room-type air conditioning unit. The frame 12 has a stiffening flange 16 extending inwardly from the top edge, a similar flange 18 extending inwardly from the left edge, as viewed in Fig. 3, and a flange 20 extending inwardly from the right edge, as viewed in the same figure. Joining the flange 20 is a mounting plate 22 extending in normal relation to the main panel of the frame 12 and having a stiffening flange 24. The plate 22 has an opening 26 in which is received a shaft 28 of a composite thermal control switch 30 of the general type disclosed in the above mentioned copending application.

The switch 30 is shown as secured to the mounting plate 22 by means of fastening elements 32 passing through suitable openings therethrough and through registering openings in a pair of oppositely disposed flanges 34 carried by the switch 30. The flanges 34 are mounted on the switch 30 in spaced relation to the left end, as viewed in Fig. 1, so that this end of the switch projects past the plane of the plate 22. Extending inwardly from the bottom edge of the main panel is a flange 36. From the left edge, as viewed in Fig. 1, of the flange 36 extends upwardly a standard 38 apertured at 40 for journaling the free end of the control shaft 28.

A pair of elongated parallel slots 42 and 44 are formed in the main panel 15 of the frame 12 and in these slots are received actuator bars 46 and 48 respectively. To the outer end of the bars 46 and 48 may be secured knobs (not shown) for sliding movement of the bars along the length of their respective slots. The inner end of the bar 46 is connected to a slide assembly 50 having slide plates 52 and 54 on opposite sides of the main panel of the frame 12. Ball bearings 56 may be provided to facilitate the sliding movement of the assembly 50. To the inner surface of the plate 52 is secured an eyelet 58 to which may be connected linkages (not shown) for operation of the conventional baffle and damper. The inner end of the bar 48 is connected to a slide assembly 60 having opposed plates 62 and 64. Ball bearings 66 may be provided to aid the operation of the slide assembly 60.

According to the present invention, the shaft 28 may be rotated by sliding movement of the bar 48 to afford selective operation of the switch units of the composite switch 30 to effect a plurality of cooling ranges, to de-energize the refrigeration unit and effect just ventilation, to exhaust air from a room or to turn the unit off. For this purpose, a flange 68 is shown as extending perpendicularly from the lower edge of the plate 62. To the flange 68 is secured a rack 70, which extends through an opening 72 in the flange 36 and meshes with a pinion gear 74 keyed to the shaft 28. A roller 75 is journaled in the main panel 15 for guiding the rack 70 which may be provided with longitudinally extending slots 77 on each side surface for reception of lugs 79 formed integrally with the flange 36 to assure movement thereof parallel with the main panel 15. By this arrangement, the two essential controls for operation of a room-type air conditioning unit are compactly arranged for convenient operation.

The rotary switch of applicant's copending application is described as being readily modifiable to include additional switch units, as desired. The present switch 30, like the rotary switch of applicant's copending application, includes terminals that may be employed in switch units for selectively energizing the fan circuit and the compressor circuit, or alternately, for energizing the circuit of an electric resistance unit for heating purposes. In the present instance, the switch 30 is provided with terminals 80 and 82 for a reversing switch unit 84, shown diagrammatically in Fig. 4. In this figure, the switch unit 84 is shown in the position it assumes when set for operation of the fan motor in the normal direction of rotation. In this position, a double throw switch arm 86 having at its free end a movable contact 88 is urged into the position shown by cam surface 90 of a bipartite cam 92. The switch arm 86 is connected at 87 to the terminal 82 and has a peak 94 which rides on the cam surface 90 normally to retain the movable contact 88 in engagement with a fixed contact 96 connected by a conductor 98 to a coil 100 of the fan motor. The cam 92 is also provided with a cam surface 102 having a lobe 104 for selective engagement with a peak 106 formed on a double throw switch arm 108. The switch arm 108 is similar in construction to the switch arm 86 and is shown as connected at 110 to the terminal 80. At the free end of the switch arm 108 is a movable contact 112 shown in Fig. 4 as connected to a fixed contact 114 connected by a conductor 116 to the coil 100.

With reference now to Fig. 4a, the switch unit 84 is shown in the position it assumes when the fan motor is set for reverse operation. In this position, the lobe 104 of the cam surface 102 has urged the switch arm 108 upwardly so that the movable contact 112 engages a fixed contact 118 connected by a jumper 120 to the conductor 98. The movable contact 88 is brought into engagement with a fixed contact 112 electrically connected to the contact 114. This is made possible by a recess 124 formed on the surface of the cam 90. The recess 124 is diametrically opposed to the position of the lobe 104 on the cam surface 102. By this arrangement, the flow of electric current through the coil 100 is reversed and the fan motor is rotated oppositely to expel air from a room.

Referring now to Fig. 5, there is shown in this figure an operational chart for an air-conditioner controlled by the present apparatus. This chart shows the relative positions of the cams of the switch units at any particular phase of rotation of the shaft 28 and indicates that at the "off" position of the bar 48, the thermostat cam and fan switch cam are set up for de-energization of their respective circuits. Upon rotation of the shaft 28 in one direction approximately 41.5°, the fan circuit is energized for rotation of the fan in the reverse direction while no change is effected in the thermostatic cam. When the shaft 28 is rotated in the opposite direction the same number of degrees, the fan circuit is energized for rotation of the cam in the normal direction while no change is effected in the thermostatic switch unit. This is the ventilation position, in which fresh air is introduced from the outside and is not cooled. Further rotation of the shaft 28 produces no change in the fan switch circuit but progressively decreases the operative ranges of the thermostatic switch unit. For instance, rotation to 83° will afford operation of the air conditioning unit with a high limit of 82° F. A total rotation of 290.5° will afford a range of operation with a top limit of 65° F. The degrees of rotation shown are merely illustrative and are not intended to be limiting in any way. The indexing cam, as described in applicant's co-pending application, merely provides finite positions for the control shaft 28.

According to the present invention also, means are provided for precluding operation of the bar 46 into certain positions when the bar 48 is in certain positions, and vice versa. To this end, an interlock plate 130 is pivotally mounted for limited rotation in a plane parallel to the main panel 15 of the frame 12 about a pivot point 132. The plate 130 has a perpendicularly extending ear 134 against which abuts a compression spring 136, the other end of which engages a lug 138 which may be struck from the main panel 15. The spring 136 normally biases the interlock plate 130 to the left, as viewed in Figure 6. For assuring movement of the plate 130 parallel to the main panel 15, the upper edge thereof is formed arcuately and is received in a guideway 131 formed by a pin 133 on which is mounted a spacer collar 135. In Figure 6, the bar 46 is set at the "Cool" position, in which position cooling may be effected without ventilation. In that position of the bar 46, the bar 48 may be moved to the "Vent" position for cooling with ventilation, but movement to the "Exhaust" position is prevented by an edge 137 defining in part a recess 139.

If, however, the bar 48 is shifted to the position C or the position R or any of the intermediate cooling positions, the movement of the bar 46 is limited to the "Cool-Vent" and "Cool" positions as shown in Fig. 6a since the cooling function must be limited to those particular settings of the bar 46. For limiting the movement of the bar 46 to these two positions, the interlock plate 130 is provided with a recess 142 along one edge thereof. As soon as the bar 48 is raised to the position C, the plate 130 is free to be moved by the force of the spring 136 to the position shown in Fig. 6a. It will be apparent that if movement of the bar 46 to the "Vent" position or the "Exhaust" position is desired, the bar 46 must be actuated before movement of the bar 48 from either "Vent" or the "Off" positions. To this end, the left edge of the plate 130, as viewed in Fig. 1, has a cam surface 145 engageable by the bar 46 for movement of the plate to the position shown in Figure 6b and a cam surface 147 engageable by the bar 46 for movement of the plate 130 to the position shown in Figure 6c.

If the bar 46 is shifted to the "Vent" position it comes into engagement with a sloping edge 145 on the interlock plate 130 and pivots the interlock plate against the force of the spring 136 to the position shown in Fig. 6b. In this position, movement of the bar 48 is limited to the "Vent" and the "Off" positions. By this means, the fan motor switch may be energized while the baffle and damper are open and the compressor circuit de-energized.

Referring now to Figure 6c, in the event that the bar 46 is first moved to the "Exhaust" position, the plate 130 is pivoted about its axis to the right, as viewed in that figure, so that the movement of the bar 48 is limited to the "Off" or the "Exhaust" positions by edges 141 and 143 defining a recess 146 which communicates with the recess 139, as shown in Fig. 6b.

When the air conditioning unit is turned off, the bar 48 is moved downward and engages a cam surface 149 on the right edge of the plate 130, as viewed in Figure 1, for movement of the plate 130 to the position shown in Figure 6 as the bar 48 reaches the "Off" position. As pointed out above, the bar 46 must be moved to its selected position before the bar 48 is actuated.

It will be understood that various modifications and variations of the present invention may be effected without departing from the spirit and scope of the novel concepts thereof.

I claim as my invention:

1. In an apparatus of the class described, a casing, a first bar slidably guided in said casing for rectilinear movement therealong into more than two control positions, a second bar slidably guided in said casing for movement parallel to movement of said first bar into more than two control positions, an interlocking plate pivotally mounted on said casing for coordinating movement of said bars, said interlocking plate having spaced camming surfaces on one side thereof engaged by said first bar to effect pivotal movement of said interlocking plate upon movement of said first bar into certain control positions and also having a camming surface on the side thereof adjacent said second bar engaged by said second bar upon movement thereof into certain control positions for effecting movement of said interlocking plate into positions to prevent movement of said first bar into certain operative positions and also having a movement limiting slot in communication with said camming surface associated with said second bar for limiting movement of said second bar in accordance with a control position of said first bar.

2. In an apparatus of the class described, a casing, a first bar slidably guided in said casing for rectilinear movement therealong into more than two opposite control positions, a second bar slidably guided in said casing for movement parallel to movement of said first bar into more than two opposite control positions, and interlocking means coordinating movement of said bars with respect to each other and preventing movement of said first bar when said second bar is in certain control positions comprising an interlocking plate pivotally mounted on said casing and extending between said bars, a spring biasing said interlocking plate into engagement with said first bar, said interlocking plate having camming surfaces extending along one side thereof engaged by said first bar upon rectilinear movement thereof for moving said interlocking plate in accordance with movement of said first bar into certain control positions and also having a camming surface on the opposite side thereof from said first bar and engaged by said second bar and moving said interlocking plate in accordance with movement of said second bar into certain selected control positions, and also having movement limiting abutment faces in association with said cam faces on each side of said interlocking plate for preventing movement of certain of said bars when the other of said bars is in certain operative positions.

3. A control apparatus of the class described comprising a first bar movable linearly into a plurality of operative control positions for selectively effecting a plurality of control operations, a second bar movable linearly in parallelism with said first bar into a plurality of operative control positions for selectively effecting a plurality of control operations, and means for coordinating the movement of said first bar and said second bar to prevent movement of said second bar into position to effect a certain control operation when said first bar is in position to effect a certain other control operation, said means including a spring-biased movable interlocking plate positioned between said bars and having cam surfaces at each side thereof and also having at one side thereof a recess in association with one cam surface and having stepped limiting faces and moved by engagement of said first bar with an associated camming surface and upon movement of said first bar into selective operative positions, for limiting travel of said second bar into certain operative positions when said first bar is in certain selected operative positions.

4. A control apparatus of the class described comprising a first bar movable linearly into a plurality of operative control positions for selectively effecting certain control operations, a second bar movable linearly in parallelism with said first bar into a plurality of operative control position for selectively effecting certain other control operations, and means for coordinating movement of said first bar and said second bar to prevent movement of said bars to effect certain control operations when one bar is in position to effect a certain control operation, said means including a rockable interlock plate normally spring-biased into engagement with said first bar, said interlock plate having cam surfaces extending along each side thereof in association with said first and second bars and having abutment faces at each side thereof in association with said cam surfaces for limiting movement of an associated bar when the other bar is in certain operative positions, said cam surfaces being engageable by a selected one of said bars for movement of said interlock plate into positions to limit movement of one bar upon movement of the opposite bar into certain operative positions.

References Cited in the file of this patent

UNITED STATES PATENTS

| | | |
|---|---|---|
| 823,522 | Gramm | June 19, 1906 |
| 1,208,575 | Kraemer | Dec. 12, 1916 |
| 1,610,505 | Fix | Dec. 14, 1926 |
| 1,682,211 | Bishop | Aug. 28, 1928 |
| 2,213,625 | Cummings | Sept. 3, 1940 |
| 2,557,351 | Jacobson | June 19, 1951 |
| 2,558,070 | Boyd | June 26, 1951 |
| 2,604,797 | Peregrine | July 29, 1952 |
| 2,647,964 | Merkel | Aug. 4, 1953 |